(12) United States Patent
Winkelmann et al.

(10) Patent No.: US 10,549,839 B2
(45) Date of Patent: Feb. 4, 2020

(54) FOLDABLE WING AND ACTUATING ARRANGEMENT

(71) Applicants: Airbus Operations GmbH, Hamburg (DE); Airbus Operations Limited, Bristol (GB)

(72) Inventors: Christoph Winkelmann, Hamburg (DE); Johannes Rupp, Hamburg (DE); David Brakes, Bristol (GB)

(73) Assignees: Airbus Operations GmbH, Hamburg (DE); Airbus Operations Limited, Bristol (GB)

( * ) Notice: Subject to any disclaimer, the term of this patent is extended or adjusted under 35 U.S.C. 154(b) by 427 days.

(21) Appl. No.: 15/619,070

(22) Filed: Jun. 9, 2017

(65) Prior Publication Data
US 2017/0355442 A1    Dec. 14, 2017

(30) Foreign Application Priority Data

Jun. 9, 2016  (EP) ..................................... 16173832

(51) Int. Cl.
| | |
|---|---|
| *B64C 3/56* | (2006.01) |
| *F15B 15/02* | (2006.01) |
| *F16H 19/08* | (2006.01) |
| *F16H 48/20* | (2012.01) |
| *F15B 15/20* | (2006.01) |

(52) U.S. Cl.
CPC ................ *B64C 3/56* (2013.01); *F15B 15/02* (2013.01); *F16H 19/08* (2013.01); *F16H 48/20* (2013.01); *F15B 2015/206* (2013.01)

(58) Field of Classification Search
CPC ..... B64C 3/56; B64C 2201/102; F15B 15/02; F15B 2015/206; F16H 19/08; F16H 48/20
See application file for complete search history.

(56) References Cited

U.S. PATENT DOCUMENTS

| | | | |
|---|---|---|---|
| 4,858,490 A | 8/1989 | Grant | |
| 6,260,799 B1 | 7/2001 | Russ | |
| 8,840,057 B2* | 9/2014 | Moret | ..................... B64C 27/12 244/6 |
| 2011/0001016 A1* | 1/2011 | Skillen | ..................... B64C 3/40 244/218 |
| 2014/0117151 A1 | 5/2014 | Fox et al. | |
| 2015/0014478 A1 | 1/2015 | Lassen et al. | |
| 2015/0336657 A1 | 11/2015 | Townsend et al. | |
| 2016/0137285 A1 | 5/2016 | Good et al. | |

(Continued)

OTHER PUBLICATIONS

Search Report for EP 16173832.3 dated Nov. 28, 2016, 5 pages.

*Primary Examiner* — Rodney A Bonnette
(74) *Attorney, Agent, or Firm* — Nixon & Vanderhye P.C.

(57) ABSTRACT

A wing (5) having a base section (5) and a tip section (13), the base section (7) having a first end portion (9) and a second end portion (11), the tip section (13) having a third end portion (15) and a fourth end portion (17), wherein the second end portion (11) and the third end portion (15) are coupled so that the tip section (13) is pivotable with respect to the base section (7) about a pivot axis (19, 19'), and an actuating arrangement having an actuator (21) which is coupled to the base section (7) and the tip section (13) and which is operable to effect a pivotal movement of the tip section (13) relative to the base section (7) between a stowed position and a deployed position.

15 Claims, 10 Drawing Sheets

(56) References Cited

U.S. PATENT DOCUMENTS

2017/0355438 A1* 12/2017 Bishop ................... B64C 3/56
2017/0355440 A1* 12/2017 Bishop ................... B64C 3/56
2017/0355443 A1* 12/2017 Winkelmann ............ B64C 3/56
2017/0355444 A1* 12/2017 Lorenz ................... B64C 3/56

* cited by examiner

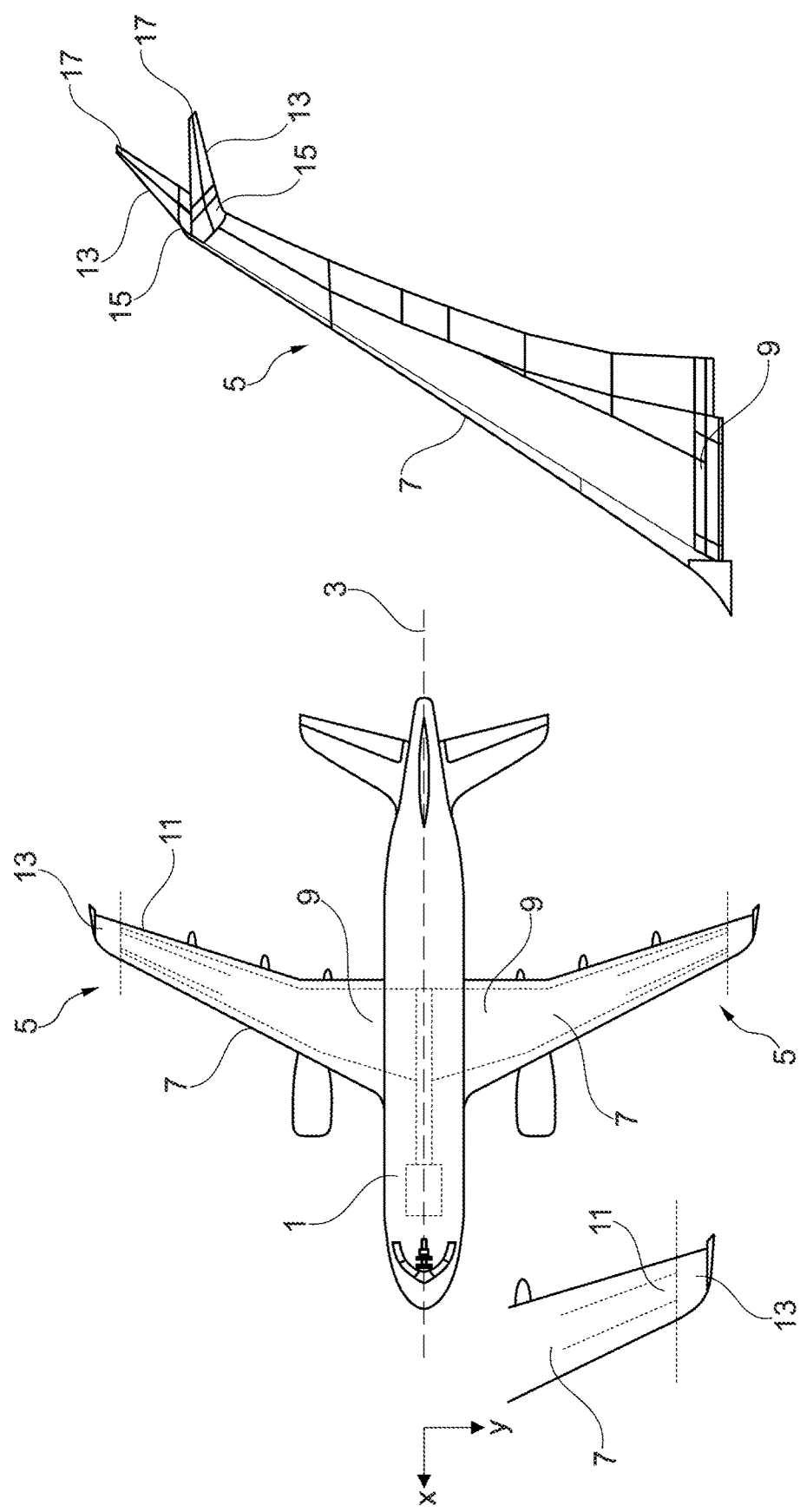

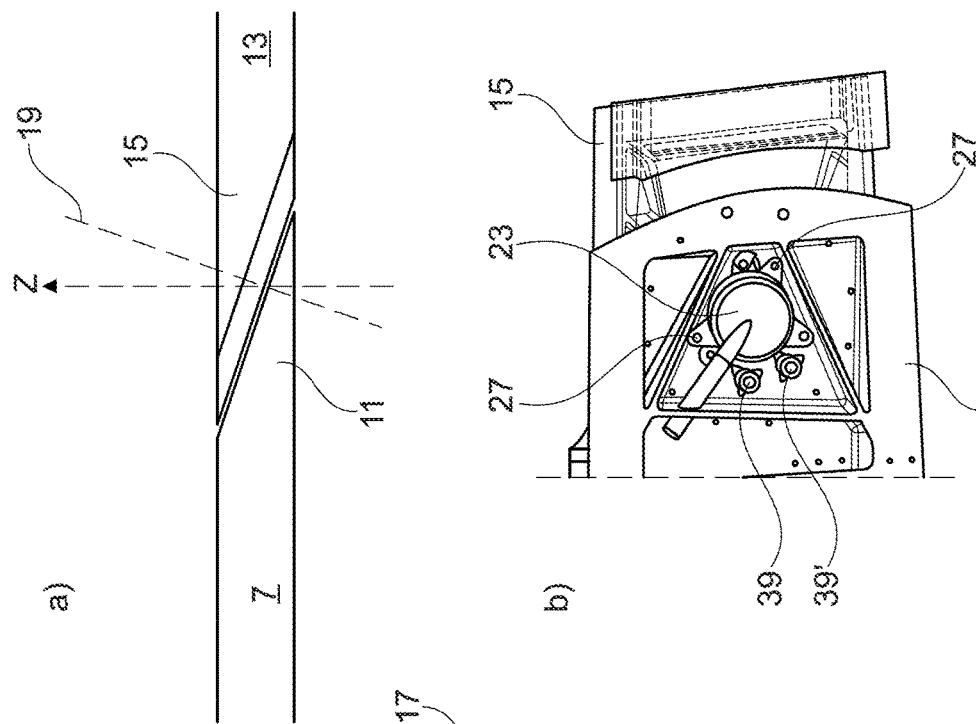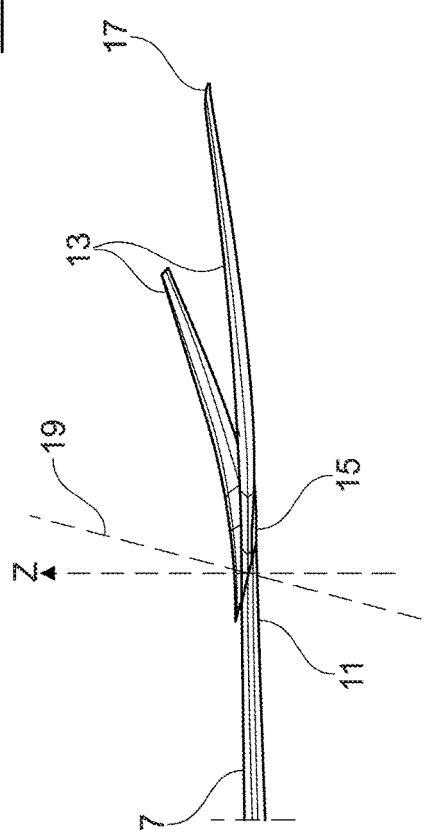

FOLDABLE WING AND ACTUATING ARRANGEMENT

RELATED APPLICATION

This application claims priority and incorporates by reference European Patent Application No. 16173832.3 filed Jun. 9, 2016.

BACKGROUND AND SUMMARY OF INVENTION

The present invention relates to a wing arrangement for an aircraft comprising a wing having a base section and a tip section, the base section having a first end portion and a second end portion, the tip section having a third end portion and a fourth end portion, wherein the first end portion is adapted to be coupled to the fuselage of the aircraft and wherein the second end portion and the third end portion are coupled with each other so that the tip section is pivotable with respect to the base section about a pivot axis.

The aspect ratio, i.e. the ratio of span to chord, of an aircraft wing is one factor influencing the efficiency of the aircraft during flight. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft is to provide for a foldable wing construction which allows to pivotably move an outboard end portion of the wing between a deployed position, in which the wing has its normal flight configuration, and a stowed position, in which the wing has a folded configuration and the wingspan is decreased as compared to the deployed position.

The present invention may be embodied as a wing arrangement having a foldable wing which is safe and reliable in operation and has at the same time a simple construction.

A wing arrangement according to an embodiment of the present invention comprises a wing having a base section and a tip section, the base section having a first end portion and a second end portion, the tip section having a third end portion and a fourth end portion, wherein the first end portion is adapted to be coupled to the fuselage of the aircraft, wherein the second end portion and the third end portion are coupled with each other so that the tip section is pivotable with respect to the base section about a pivot axis. In particular, a pivotal movement of the tip section relative to the base section between a stowed position and a deployed position is enabled, wherein the spanwise length of the wing is larger in the deployed position than in the stowed position. In other words, the length of the entire wing measured parallel to the y-axis of the aircraft to which the wing arrangement is coupled, is larger in the deployed position than in the stowed position.

Thus, the wing arrangement is formed of two sections, namely the base section intended to be secured to the fuselage of the aircraft and the tip section pivotably connected to the distal end of the base section. Further, in one embodiment the pivot axis may extend in chord direction of the wing so that the tip section pivots about an axis which is arranged horizontally or essentially parallel to the x-axis of the aircraft, and in the stowed position the tip section extends vertically. In another embodiment the pivot axis may extend nearly parallel to the z-axis of the aircraft on which the wing arrangement of the present invention is mounted. In particular, it can be tilted by 15° with respect to the vertical direction or z-axis so that when the tip section pivots rearwards or forwards from the deployed position in which the tip section is aligned with the longitudinal axis of the base section, to the stowed position, the distal end of the tip section moves upwards.

Furthermore, the wing arrangement of the present invention comprises an actuating arrangement having an actuator which is coupled to the base section and the tip section and which is operable to effect the pivotal movement of the tip section relative to the base section between the stowed position and the deployed position. The actuator has a rotatable actuator input shaft which is rotatably supported on the base section, and the actuator is configured such that rotationally driving the actuator input shaft effects a pivotal movement of the tip section relative to the base section about the pivot axis between the deployed and stowed positions.

In addition, the actuating arrangement comprises a differential gearbox having a rotatable output shaft, a first rotatable input shaft and a second rotatable input shaft, and the first input shaft, the second input shaft and the output shaft are coupled such that rotary power applied to the first and/or second input shaft is transmitted to the output shaft, wherein the first and second input shafts are capable of being simultaneously rotatingly driven with different rotational speeds. Thus, the differential gearbox is configured as a common differential gear assembly which is capable of transmitting rotary power input via the first and second input shafts to the output shaft wherein the rotational power is combined.

Finally, the actuating arrangement comprises a first motor and a second motor each having a rotationally driven output shaft, wherein the first input shaft of the differential gearbox is coupled to the output shaft of the first motor and the second input shaft of the differential gearbox is coupled to the output shaft of the second motor. Hence, the input shafts of the differential gearbox can rotationally be driven by the motors. The output shaft of the differential gearbox is coupled to the actuator input shaft so that it is rotationally driven by the output shaft of the differential gearbox.

The assembly of the first and second motor which are both coupled with the inputs of the differential gearbox so that the output thereof drives the actuator allows to employ two independently driven motor to supply torque to the actuator. Hence, when one of the motors or the respective power supply fails, the actuator can still be operated by the other motor.

In one embodiment, the pivotal movement of the tip section is effected by operating only one of the motors at the same time whereas the other motor is not supplied with power so that it remains passive. In this embodiment the actuating arrangement is operated in the passive/active mode.

Further, the use of the above-described differential gearbox also allows for a so-called active/active mode of operation in which both motors are simultaneously operated to pivot the tip section so that the rotational power supplied by the motors is combined at the actuator input shaft to drive the latter. In a configuration employing the active/active mode smaller, less powerful motors can be used which leads to weight savings. However, the motors still have to be dimensioned such that operation of only one motor is sufficient to pivot the tip section even if this occurs with a lower speed compared to the situation in which both motors are operated.

In an embodiment the first input shaft of the differential gearbox is coupled to a first brake assembly which is operable to selectively allow or prevent rotation of the first input shaft. Further, the second input shaft of the differential gearbox is coupled to a second brake assembly which is operable to selectively allow or prevent rotation of the second input shaft. Such an arrangement is particularly useful when the drag torque of the motors coupled to the input shafts of the differential gear box is small so that if only one of the motors is operated the other would be reversely driven by the input shaft connected to it. In such case the respective brake assembly would be activated to prevent such reverse driving of the motors.

In another embodiment the first motor is a hydraulic motor and has a first hydraulic connection which is connected to a first connector being adapted to be coupled to a first hydraulic supply of the aircraft, the first hydraulic supply being capable of supplying a plurality of consumers in the aircraft. This allows to supply at least one of the motors for pivoting the tip section by a hydraulic system of the aircraft.

If the aircraft to which the wing arrangement of the present invention is coupled comprises a second supply system which is capable of supplying pressurized hydraulic fluid independent from the first hydraulic supply system, it is further preferred when the second motor is also a hydraulic motor and has a second hydraulic connection which is provided with a second connector being adapted to be coupled to the second hydraulic supply of the aircraft. In such case the redundancy of the actuation mechanism for pivoting the tip section relies upon the fact that the independently acting hydraulic systems used in the aircraft are employed as power sources.

As an alternative the second motor can be an electric motor, so that the first motor is hydraulically driven whereas the second motor is electrically driven. This also results in the required redundancy but avoids that further hydraulic conduits for connecting with the second hydraulic system of the aircraft have to be guided to the distal end of the base section.

Finally, both the first and the second motors may be electric motors which entirely avoids the necessity of hydraulic conduits being guided to the distal end of the base section of the wing.

The actuating arrangement includes a latching arrangement with a latching device which comprises a support fixed to one of the base section and the tip section, a latching element moveable relative to the support between a latching position and a release position, a first actuation element and a second actuation element. Further, the latching arrangement comprises an engagement element mounted on the other of the base section and the tip section, the latching device and the engagement element being configured such that when the tip section is in the deployed position and the latching element is in the latching position, the latching element engages with the engagement element so as to prevent the relative pivotal movement between the base section and the tip section, and when the latching element is in the release position, the latching element is disengaged from the engagement element, so that the pivotal movement between the base section and the tip section is enabled, wherein the actuation elements are coupled to the latching element and configured such that when at least one of the actuation elements is operated, the latching element is forced into the release position.

Thus, the latching device is configured to latch the tip section in the deployed position so as to prevent that the tip pivots away from the deployed position towards the stowed position. The tip section is released when the latching element is moved to the release position by means of the actuation elements. Further, by means of two actuation elements coupled to a sole latching element, it is ensured that if one of the actuation elements or its power supply fails, the latching element can still be operated by the other actuation element, so as to have a redundant system.

Similarly, the latching device and the engagement means may be further configured such that when the tip section is in the stowed position and the latching element is in the latching position, the latching element is in engagement with the engagement means so as to prevent a pivotal movement of the tip section away from the stowed position. Hence, the latching arrangement may also be able to latch the tip section in stowed position.

In a further embodiment, the first and the second actuation elements are hydraulically powered, and the first actuation element is connected to a first connector which is adapted to be coupled to a first hydraulic supply of the aircraft, the first hydraulic supply being capable of supplying a plurality of consumers in the aircraft. In addition, the second actuation element is connected to a second connector which is adapted to be coupled to a second hydraulic supply of the aircraft, the second hydraulic supply being also capable of supplying a plurality of consumers in the aircraft.

Thus, similar to the motors coupled with the differential gearbox, the actuation elements of the latching device may also be supplied by independently working hydraulic supplies or systems of the aircraft on which the wing arrangement is mounted. In particular, the connectors of the first motor and the first actuation element may be connected to the same first hydraulic system whereas the connectors of the second motor and the second actuation element may be coupled with the same second hydraulic system of the aircraft.

Alternatively, the first and the second actuation elements are hydraulically powered, the first actuation element is connected to a first connector which is adapted to be coupled to a hydraulic supply of the aircraft, the hydraulic supply being capable of supplying a plurality of consumers in the aircraft. Further, the actuating arrangement comprises a hydraulic pump which includes a rotatable input shaft and a hydraulic output, and an electric drive motor the output of which is coupled with the input shaft of the hydraulic pump. Finally, the hydraulic output of the hydraulic pump is hydraulically connected with the second actuation element.

Hence, in this embodiment one actuation element is supplied by a hydraulic supply of the aircraft whereas the other actuation element is supplied with pressurized hydraulic fluid provided by a hydraulic pump which is independently driven by an electric motor, so a sole hydraulic supply has to connected with elements at the distal end of the base section of the wing. Here, the redundancy is ensured by the electric motor combined with the hydraulic pump which are both operated when the hydraulic supply of the aircraft fails.

Moreover, both the first and the second actuation elements may be electrically powered, so that the latching device is independent from any hydraulic supply of the aircraft.

In one embodiment, the actuator comprises a threaded spindle rotatably supported and axially fixed on the base section, and a nut member which threadingly engages with the threaded spindle and which is mounted on the tip section in such a manner that it cannot rotate with respect to the longitudinal axis of the threaded spindle. Further, the actuator input shaft is coupled to the threaded spindle so that rotation of the actuator input shaft effects rotation of the spindle or the actuator input shaft is part of the threaded spindle. Thus, in this embodiment the actuator is formed as a jack screw arrangement which can be combined in a simple manner with a tip section which is pivotable with respect to a pivot axis that extends in chord direction of the wing, i.e. it is essentially parallel to the x-axis of the aircraft which axis essentially corresponds to the longitudinal axis of the fuselage.

In a further embodiment, a spindle locking device is interconnected between the actuator input shaft and the threaded spindle and which is configured such that the threaded spindle is brought into engagement with the second end portion so as to prevent rotation of the threaded spindle, when the threaded spindle transmits torque to the actuator input shaft, and that when torque is transmitted from the actuator input shaft to the threaded spindle, the threaded spindle is rotatable with respect to the second end portion. Such a so-called "No-Back Mechanism" is particularly advantageous when the afore-mentioned assembly with a threaded spindle is employed to pivot the tip section upwards about an essentially horizontal pivot axis. In this case the no-back mechanism prevents the tip section from pivoting from the stowed position back to the deployed position due to its own weight. Hence, it is not required that additional latching means are provided to latch the tip section in the stowed position.

In another embodiment, the actuator comprises a base member and an output member, wherein the output member is pivotably mounted on the base member so that the output member may pivot with respect to the base member about the pivot axis. The base member is fixed to the second end portion and the output member is fixed to the third end portion, i.e. the base member is secured to the base section of the wing, whereas the output member is secured to the pivotable tip section. A gear assembly is connected to the actuator input shaft and the output member, the gear assembly being configured such that rotationally driving the actuator input shaft with a first rotational speed results in a pivot movement of the output member relative to the input member about the pivot axis with a second rotational speed smaller than the first rotational speed. Such a geared rotary actuator can designed with small dimensions in the direction of the pivot axis, e.g. by employing planetary gear stages in the gear assembly, so that it can employed when the pivot axis about which the tip section pivots, extends in an essentially vertical direction, i.e. it is nearly parallel to z-axis of the aircraft and, as discussed above, preferably tilted by about 15° to the z-axis.

Finally, the actuating arrangement of the wing arrangement of the present invention may comprise a first end stop fixedly connected to the base section and a first abutment member fixed on the tip section, the first end stop and the first abutment member being configured such that in the deployed position the first end stop and the first abutment member abut on each other and prevent a further pivotal movement of the tip section relative to the base section in a direction opposite to the direction towards the stowed position.

In addition, a second end stop is fixed to the base section, and a second abutment member is fixed to the actuator input shaft, the second end stop and the second abutment member being positioned such that an abutment of the second end stop and the second abutment member prevents a further rotation of the actuator input shaft in a rotational direction that effects a pivotal movement of the tip section about the pivot axis towards the deployed position.

The positions of the first and second end stops and the first and second abutment members are chosen such that when the first end stop abuts on the first abutment member, the second end stop is spaced from the second abutment member so that a predetermined amount of rotational movement of the actuator input shaft in that rotational direction which effects a pivotal movement of the tip section towards the deployed position is required to bring the second end stop into abutment with the second abutment member.

Thus, due to the fact that the first end stop abuts on the first abutment member before there is an abutment between the second end stop and the second abutment member, it is possible to apply a predetermined bias or force which presses the tip section against the first end stop and prevents that due to play and elasticity in the drive train formed by the motors and the actuator the tip section may pivot backwards away from the first end stop. This bias or force is obtained by also bringing the second end stop member into contact with the second abutment member.

So, the tip section is kept in position on the first abutment member which is particularly desirable, when a latching device is employed the latching element of which can only brought into engagement with the respective engagement member, when the tip section is exactly in the deployed position.

However, as there is a well defined distance between the abutment positions the bias or force applied to the tip section and the first end stop and the first abutment member, respectively, is limited. This is particular useful, because the torque at the output of the actuator, in particular when comprising a reduction gear assembly, is much higher compared to the torque applied to actuator input shaft, so that a slightly excessive torque at the input shaft may result in much higher forces applied to the first end stop and the first abutment member which would structurally have to be accounted for when there was no additional end stop assembly on the actuator input shaft. Such excessive torque can readily occur as it is often not possible to stop the motors coupled to the differential gearbox at a correct point in time and there is the additional uncertainty due to the inertia of the differential gear box.

Finally, the above embodiments may be included in an aircraft comprising a fuselage and at least one of the above-described wing arrangements.

SUMMARY OF DRAWINGS

In the following preferred embodiments of the present invention will be described with reference to the accompanied drawings.

FIG. 1 is a schematic top view of an aircraft to which an embodiment of a wing arrangement according to a first embodiment of the present invention is secured, FIG. 2 is a top view of a wing of the first embodiment of a wing arrangement of the present invention, FIG. 3 is a partial front view of the wing of FIG. 2, FIG. 4 shows a partial longitudinal sectional view (Part a)) and a partial sectional view from the bottom of the wing of FIG. 2 (Part b))

DETAILED DESCRIPTION

Figure 6:
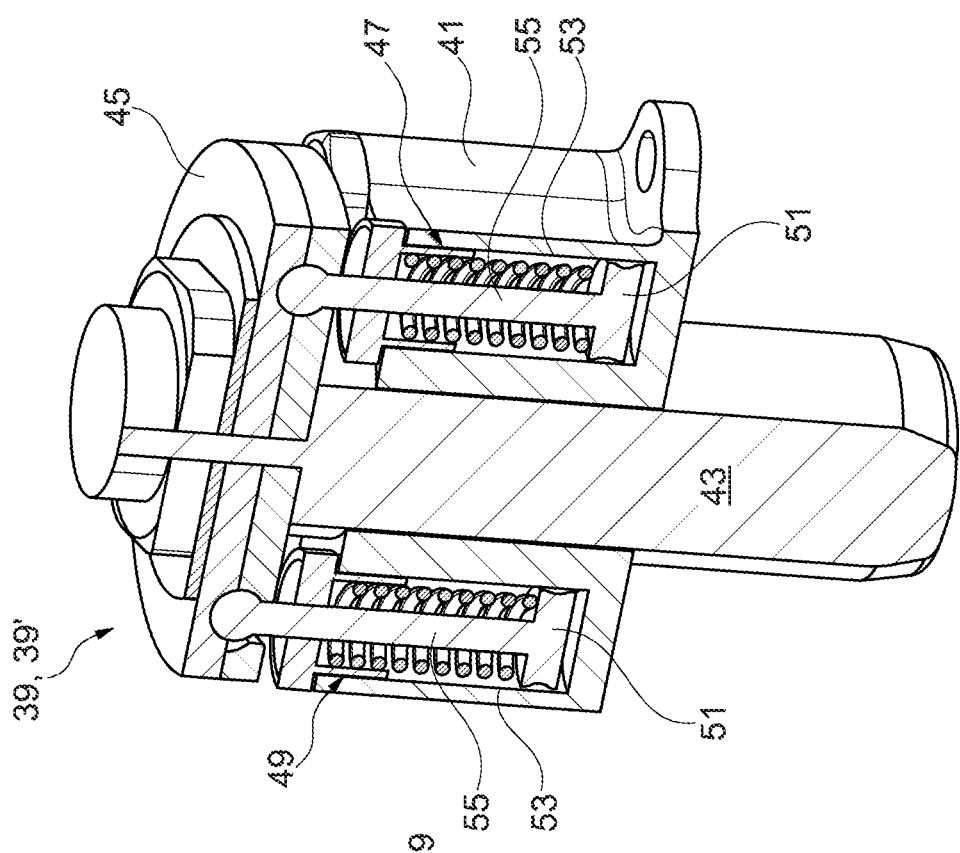
FIG. 6 is a cross sectional view of a part of the latching arrangement of the wing of FIG. 2.

FIG. 1 shows a schematic top view of an aircraft being provided with two wing arrangements according to a first embodiment of the present invention. The aircraft comprises a fuselage 1 extending along a longitudinal axis 3 which corresponds to the x-axis of the aircraft (the y-axis extends perpendicular to the x-axis in a horizontal plane when the aircraft is on the ground, whereas the z-axis extends vertically perpendicular to the x and y-axes). The wings 5 extend away from the fuselage 1, and each wing 5 comprises a base section 7 having a first end portion 9 which is coupled to the fuselage 1. As it can also be seen from FIG. 2 showing the wing 5 of FIG. 1 in more detail, the base section extends between the first end portion 9 and a second end portion 11 (as it is also shown in the insert of FIG. 1).

A tip section 13 of the wing 5 is pivotably connected to the second end portion 11 of the base section 7. In particular, the tip section 13 extends away from the distal end or second end portion 11 of the base section 7 and comprises a third end portion 15 and a fourth end portion 17. The third end portion 15 is pivotably mounted on the second end portion 11 of the base section 7 so that the tip section 13 may pivot between a deployed position and a stowed position about a pivot axis 19 (see FIG. 3). The pivot axis 19 extends essentially vertically but is tilted, in this preferred embodiment by 15°, with respect to the z-axis of the aircraft, as it is shown in FIG. 3. The tip section 13 may pivot between a deployed position in which it extends essentially along the longitudinal axis of the base section 7, and a stowed position in which the tip section 13 is angled backwards with respect to the longitudinal axis of the base section 7 (see FIGS. 2 and 3. which show both positions). In particular, as shown in FIG. 2, the spanwise length of the entire wing 5 formed of the base section 7 and the tip section 13 is larger in the deployed position than in the stowed position. In other words, in the deployed position the length of the entire wing 5 measured parallel to the y-axis is larger compared to the stowed position. Further, the pivot axis 19 is tilted such that the fourth end portion 17 of the tip section 13, when the tip section 13 pivots from the deployed position to the stowed position, moves upwards, as shown in FIG. 3.

In order to effect the pivotal movement of the tip section 13 between the deployed and the stowed positions, an actuator 21 is provided which is coupled to the base section 7 and the tip section 13.

Figure 5:
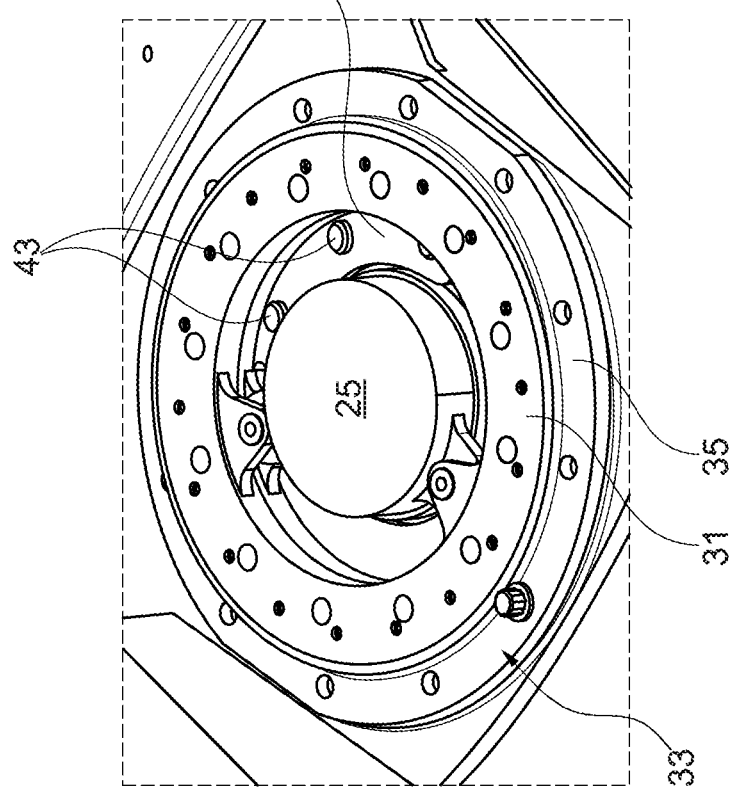
FIG. 5 is a partial perspective view of the connection between the second end portion and the third end portion in the wing of FIG. 2.

As shown in FIGS. 4 and 5, the actuator 21 of the first preferred embodiment comprises a base member 23 and an output member 25. The base member 23 is fixedly connected to the second end portion 11 of the base section 7 via flaps 27 on the base member 23. As shown in FIG. 5 the output member 25 is fixedly connected to the third end portion 15 of the tip section 13. In particular, flaps on the output member 25 are connected to an inner ring 31 of a support bearing 33 for pivotably supporting the tip section 13 on the base section 7. The inner ring 31 in turn is fixedly coupled with the third end portion 15 of the tip section 13 whereas an outer ring 35 of the support bearing 33 is fixed to the second end portion 11 of the base section 7.

The output member 25 is pivotably mounted on the base member 23 so that the output member 25 may pivot with respect to the base member 23 about the pivot axis 19. A gear assembly (not shown) is arranged inside a cavity formed by the base member 23 and the output member 25, and the gear assembly is connected to an actuator input shaft 37 which extends away from the base member 23 and is capable of driving the gear assembly. The actuator input shaft 37 is supported on the second end portion 11 of the base section 7. Further, the gear assembly inside the base member and the output member 23, 25 is configured such that rotationally driving the actuator input shaft 37 with a first rotational speed results in a pivot movement of the output member 25 relative to the input member 23 about the pivot axis 19 with a second rotational speed smaller than the first rotational speed. Thus, the gear assembly is formed a reduction gear assembly which increases the torque compared to the input supplied to the actuator input shaft 37, and the actuator 21 of this preferred embodiment is configured such that rotationally driving the actuator input shaft 37 effects a pivotal movement of the tip section 13 relative to the base section 7 about the pivot axis 19 between the deployed and stowed positions.

Further, the actuating arrangement of the first embodiment includes two latching devices 39, 39' shown in FIGS. 4, 5 and 6. The latching devices 39, 39' are capable of latching the tip section 13 relative to the base section 7, when the tip section is either in the deployed or in the stowed positions. To this end each latching device 39, 39' comprises a support 41 which is fixedly mounted on the second end portion 11 of the base section 7 (see FIG. 4).

The support 41 slidably supports a latching element in the form of a latching bolt 43 so that it can linearly move relative to the support 41 between an extended latching position shown in FIG. 6 and a retracted release position. A coupling plate 45 is connected to the rear end of the latching bolt 43, and a first and a second hydraulic actuation element 47, 49 are also arranged in the support 41 parallel to the latching bolt 43. The actuation elements 47, 49 each comprise a piston 51 guided in a cylinder 53. Each piston 51 is connected to the coupling plate 45 via a piston rod 55 and the chambers formed above and below the piston 51 inside the cylinders 53 are connected with hydraulic connectors as will be discussed in more detail below. Finally, a spring 57 is arranged in each cylinder 53 which biases the piston 51 towards that end position which corresponds to the extended or latching position of the latching bolt 43.

Furthermore, as can be seen in FIG. 5 an engagement element in the form of an engagement plate 59 is fixedly connected to the inner ring 31 of the support bearing 33 and, hence, fixedly connected to the tip section 13. The engagement plate 59 comprises two sets of holes, one set being aligned with the latching bolts 43 of the latching devices 39, 39', when the tip section 13 is in the deployed position whereas the other set is aligned with the latching bolts 43, when the tip section 13 is in the stowed position. When the tip section 13 is in one of these positions, the latching bolt 43 can be moved from the retracted or release position to the extended or latching position by means of the springs 57 and additionally by supplying pressurized fluid to the connection of the respective chamber of the cylinder 53 of at least one of the actuation elements 47, 49, so that the latching bolts 43 engage with the holes so as to latch the tip section 13 in the respective position. In order to release the tip section 13 and to enable pivotal movement thereof from one position to the other, the connection of the other chamber of the cylinder 53 of at least one of the actuation elements 47, 49 is supplied with pressurized fluid so that the piston 51 is moved against the biasing force of the springs 57 so as to retract the latching bolt 43 out of engagement with the holes in the engagement plate 59 to the release position. Hence, the latching device 39 is configured such that when at least one of the actuation elements 47, 49 is operated by supplying pressurized fluid to the connection of the respective chamber in the cylinder 53, the latching element or bolt 43 is forced into the release position.

Figure 7:
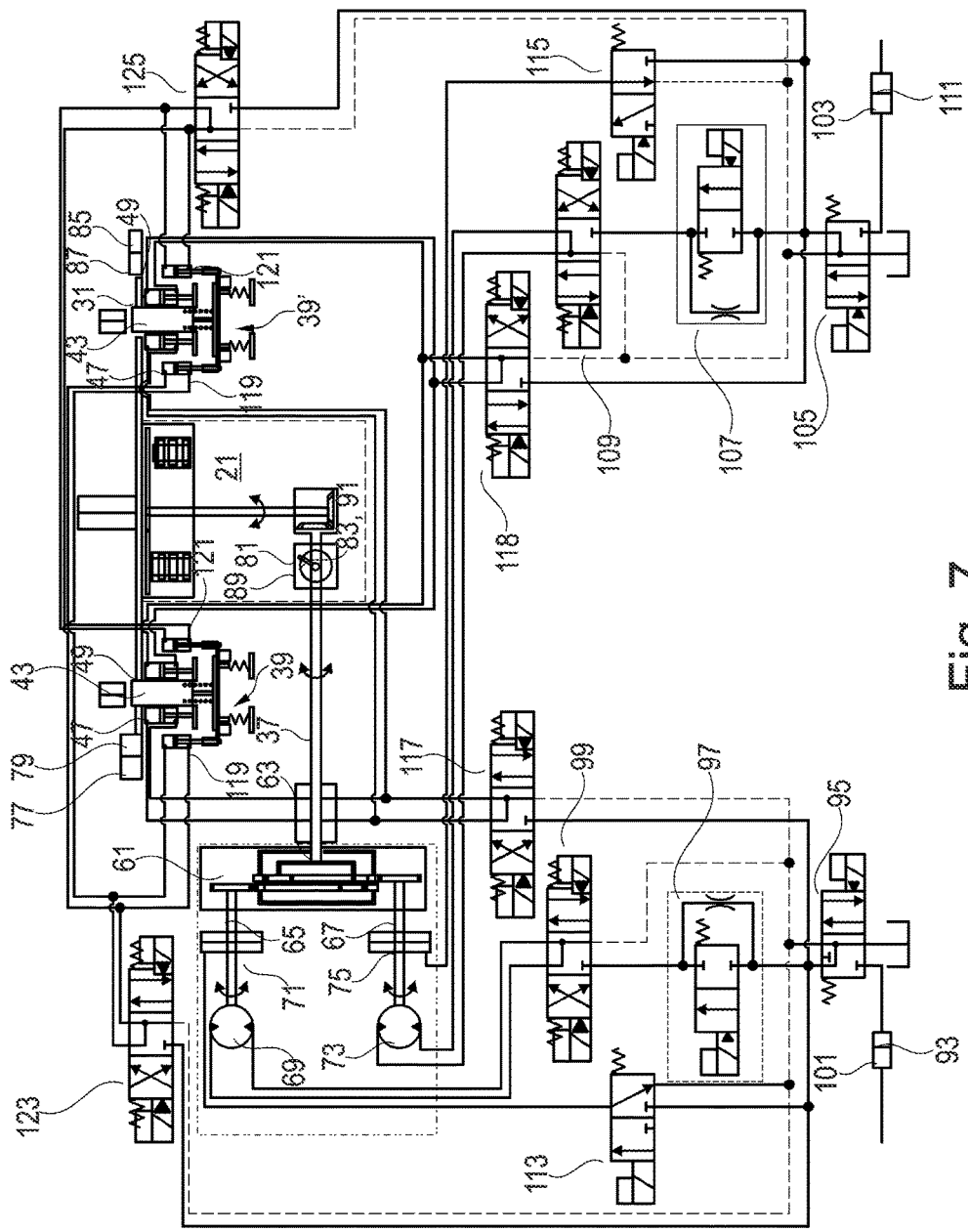
FIG. 7 is a schematic diagram showing the actuating arrangement of the first embodiment.

In FIG. 7 it is schematically shown how the actuating arrangement of the first embodiment of a wing arrangement is configured and how it operates.

Firstly, it can be seen that the actuator input shaft 37 of the actuator 21, the output member 25 of which is coupled with the inner ring 31 of the support bearing 33, is coupled to a differential gearbox 61. In particular, a rotatable output shaft 63 of the differential gearbox 61 is connected to the actuator input shaft 37 so as to be rotationally coupled. Further, the differential gearbox 61 comprises a first rotatable input shaft 65 and a second rotatable input shaft 67. Similar to a commonly know differential gearbox, the first input shaft 65, the second input shaft 67 and the output shaft 63 are coupled such that rotary power applied to the first and/or second input shaft 65, 67 is transmitted to the output shaft 63, wherein the first and second input shafts 65, 67 are capable of being simultaneously rotatingly driven with different rotational speeds. Thus, the differential gearbox 61 is capable of combining the rotational power supplied to the input shafts 65, 67 at the output shaft 63. Further, when only one of the input shafts 65, 67 is rotationally driven and the other is prevented from rotation, the rotational power supplied at the driven input shaft 65, 67 is transferred to the output shaft 63.

In the first preferred embodiment the first input shaft 65 is coupled to the output shaft of a first hydraulic motor 69 via a hydraulically actuated first brake 71. In the same way, the second input shaft 67 is coupled to the output shaft of a second hydraulic motor 73 via a second hydraulically actuated brake 75. Thus, the input shafts 65, 67 of the differential gearbox 61 can be rotationally driven either by only one of the hydraulic motors 69, 73 or by both motors 69, 73 simultaneously. The first and the second brakes 71, 75 can be actuated so as to prevent that one of the respective input shafts 65, 67 of the differential gearbox 61 rotates when only the other input shaft 63, 65 is rotationally driven. Hence, the brakes 71 are engaged, i.e. prevent rotation of the respective input shaft 65, 67, when the motor 69, 73 connected to that input shaft 65, 67 is not operating, and are released when the respective motor 69, 73 is activated.

Moreover, the actuating arrangement comprises a first end stop 77 fixedly connected to the base section 7 and a first abutment member 79 fixed on the tip section 13. The first end stop 77 and the first abutment member 79 are configured such that in the deployed position the first end stop 77 and the first abutment member 79 abut on each other and prevent a further pivotal movement of the tip section 13 relative to the base section 7 in a direction opposite to the direction towards the stowed position.

Further, a second end stop 81 is fixed to the base section 7 and a second abutment member 83 is fixed to the actuator input shaft 37, and the second end stop 81 and the second abutment member 83 are positioned such that an abutment of the second end stop 81 and the second abutment member 83 prevents a further rotation of the actuator input shaft 37 in a rotational direction that effects a pivotal movement of the tip section 13 towards the deployed position.

The positions of the first and second end stops 77, 81 and the first and second abutment members 79, 83 are chosen such that when the first end stop 77 abuts on the first abutment member 79, i.e. when the tip section 13 is in the deployed position, the second end stop 81 is still spaced from the second abutment member 83 so that a predetermined amount of rotational movement of the actuator input shaft 37 in that rotational direction which effects a pivotal movement of the tip section 13 towards the deployed position is required to bring the second end stop 81 into abutment with the second abutment member 83. Thus, when the second end stop 81 and the second abutment member 83 are also brought into contact by further rotating the actuator input shaft 37 a predetermined bias is generated in the actuator 21 which prevents the first abutment member 79 from losing contact with the first end stop 77 so that the tip section 13 is securely kept in the deployed position.

Similarly, the actuating arrangement also comprises a third end stop 85 fixedly connected to the base section 7 and a third abutment member 87 fixed on the tip section 13. The third end stop 85 and the third abutment member 87 are configured such that in the stowed position the third end stop 85 abuts on the third abutment member 87 so that a further pivotal movement of the tip section 13 relative to the base section 7 is prevented in a direction opposite to the direction towards the deployed position. Additionally, a fourth end stop 89 is fixed to the base section 7 and a fourth abutment member 91 is fixed to the actuator input shaft 37, the fourth end stop 89 and the fourth abutment member 91 being positioned such that an abutment of the fourth end stop 89 and the fourth abutment member 91 prevents a further rotation of the actuator input shaft 37 in a rotational direction that effects a pivotal movement of the tip section 13 towards the stowed position.

The positions of the third and fourth end stops 77, 81 and the third and fourth abutment members 79, 83 are chosen such that when the third end stop 85 abuts on the third abutment member 87, i.e. when the tip section 13 is in the stowed position, the fourth end stop 89 is spaced from the fourth abutment member 91 so that a predetermined amount of rotational movement of the actuator input shaft 37 in that rotational direction which effects a pivotal movement of the tip section 13 towards the stowed position is still required to bring the fourth end stop 89 into abutment with the fourth abutment member 91. Hence, by also bringing the fourth end stop 89 and the fourth abutment member 91 contact by further rotating the actuator input shaft 37, a predetermined bias can be generated in the actuator 21 which prevents the third abutment member 85 from losing contact with the third end stop 87, i.e. the tip section 13 is also kept in the stowed position.

FIG. 7 also shows that the hydraulic connections of the first hydraulic motor 69 are connected to a first connector 93 via valve assemblies 95, 97, 99. The first connector 93 is coupled to a first hydraulic supply 101 of the aircraft, the first hydraulic supply 101 supplying a plurality of further consumers in the aircraft. In the same way, the connections of the second hydraulic motor 73 are connected to a second connector 103 via valve assemblies 105, 107, 109, and the second connector 103 is coupled to a second hydraulic supply 111 of the aircraft which also supplies a plurality of consumers in the aircraft.

The valve assemblies between the first and second hydraulic motors 69, 73 and the first and second connectors 93, 103 have the following functions. The separation valves 95, 105 allow to connect or disconnect the respective hydraulic supply 101, 111 from the actuating arrangement. The speed control assemblies 97, 107 can be switched between a high speed position and a low speed position so as to reduce or increase the speed with which the hydraulic motors 69, 73 are running. Finally, by means of the actuation valves 99, 109 it can be chosen, whether the hydraulic motors 69, 73 are in idle mode or in which rotational direction they operate.

The first brake 71 is connected to the first connector 93 via a valve 113 and the separation valve 95 so that the first brake 75 can also be supplied with pressurized fluid from the first hydraulic supply 101 and selectively be actuated by the valve 113. In the same way, the second brake 75 is connected to the second connector 103 and the second hydraulic supply via selectively operable valve 115 and separation valve 105.

As can also be seen in FIG. 7 the first and the second latching devices 39, 39' are connected to the connectors 93, 103 in such a manner that the first actuation elements 47 of both the first and the second latching device 39, 39' can be supplied with pressurized fluid from the first hydraulic supply 101 via valve 117 and separation valve 95, whereas the second actuation element 49 of the first and second latching device 39, 39' are connected to the second connector 103 and the second hydraulic supply 111 via valve 118 and separation valve 105.

The latching devices 39, 39' are provided with locking mechanisms which, when hydraulically being actuated lock or unlock the latching devices 39, 39' either in the latching position or in the release position so as to prevent an unintended switching of the latching device 39, 39'. To this end, each locking mechanism comprises a first actuating element 119 and a second actuating element 121, and the first actuating elements 119 are connected to the first connector 93 and the first hydraulic supply 101 via valve 123 and separation valve 95, whereas the second actuating elements 121 are connected to the second connector 103 and the second hydraulic supply 111 via valve 125 and separation valve 105.

The first embodiment of a wing arrangement can be operated as follows.

When the tip section 13 is in the deployed position and the latching bolts 43 are in the latching position so that they engage with the holes in the engagement plate 59, in a first alternative, the arrangement can be operated in the so called active/passive mode to move the tip section 13 to the stowed position.

To this end only pressurized fluid from the first hydraulic supply 101 is employed so that the separation valve 95 is in the open position whereas the separation valve 105 is in the closed position shown in FIG. 7.

In a first step valve 123 is actuated to switch the locking mechanisms of the first and the second latching devices 39, 39' from the locking position to the enabling position by means of the first actuating elements 119 of as to allow that the latching bolts 43 are moved. Then, valve 117 is operated to move the latching bolt 43 from the extended latching position to the retracted release position by the first actuation elements 47. Then valve 123 may again be operated to lock the latching devices 39, 39' in the enabling position. However, this is not necessarily the case.

Then, the first hydraulic motor 69 is activated by the speed control assembly 97 and the actuation valve 99 and the first brake 71 is released by valve 113, so that the actuator 21 is driven via the differential gearbox 61, until the stowed position of the tip section 13 is reached, i.e. when both the third and the fourth end stop 85, 89 abut on the third and fourth abutment members 87, 89. In this position where the tip section 13 is kept in position due to the predetermined bias in the actuator 21, valve 123 may again be operated to move the locking mechanisms from the locking position to the enabling position by the first actuating elements 119 when if the locking position was activated before. Then the valve 117 is operated to move the latching bolts 43 of the latching devices 39, 39' to the latching position by means of the first actuation elements 47 so that the latching bolts 43 engage with holes in the engagement plate 59. Finally, valve 123 is again operated, to switch the locking mechanisms back into the locking position by the first actuating elements 119. In the same way, the tip section 13 can be pivoted back into the deployed position by using the first hydraulic supply 101.

If one of the elements supplied by the first hydraulic supply 101, i.e. the motor 69, the brake 71, the valves 113, 117, 123, the speed control assembly 97 or the actuation valve 99, or the supply itself fails, the aforementioned steps can also be performed with the elements supplied with the second supply 111, i.e. the second actuating elements 121 of the locking mechanisms, the second actuation elements 49 of the latching devices 39, 39' and the second hydraulic motor 73 and the second brake 75. Further, these elements can be controlled by valves 115, 118, 125, the speed control assembly 107 and the actuation valve 109.

However, it is also conceivable, that the afore-mentioned actuating arrangement is adapted to operate in the so-called active/active mode, i.e. that both the first and the second hydraulic supplies 101, 111 are simultaneously used to supply pressurized hydraulic fluid for operating the motors 69, 73, the actuation elements 47, 49 and the actuating elements 119, 121. This allows to employ smaller sized motors as these are concurrently supplying rotary power to the actuator 21, and it is not required that a single motor supplies sufficient power that the actuator 21 pivots the tip section 13 with the normal speed. The motors have only to be dimensioned such that in case, one supply or one of the elements supplied by one of the supplies 101, 111 fails, the remaining active motor is still capable of driving the actuator 21. As the motors can be dimensioned smaller, this saves weight etc.

Thus, regardless whether the actuating arrangement is adapted to operate in the active/active or in the active/passive mode, the use of the differential gearbox 61 allows to couple first and second motors 69, 73 to the sole actuator 21, and the entire actuating arrangement is designed such that the actuator 21 and the latching devices 39, 39' can independently be controlled and supplied by either the first or the second hydraulic supply 101, 111.

Figure 8:
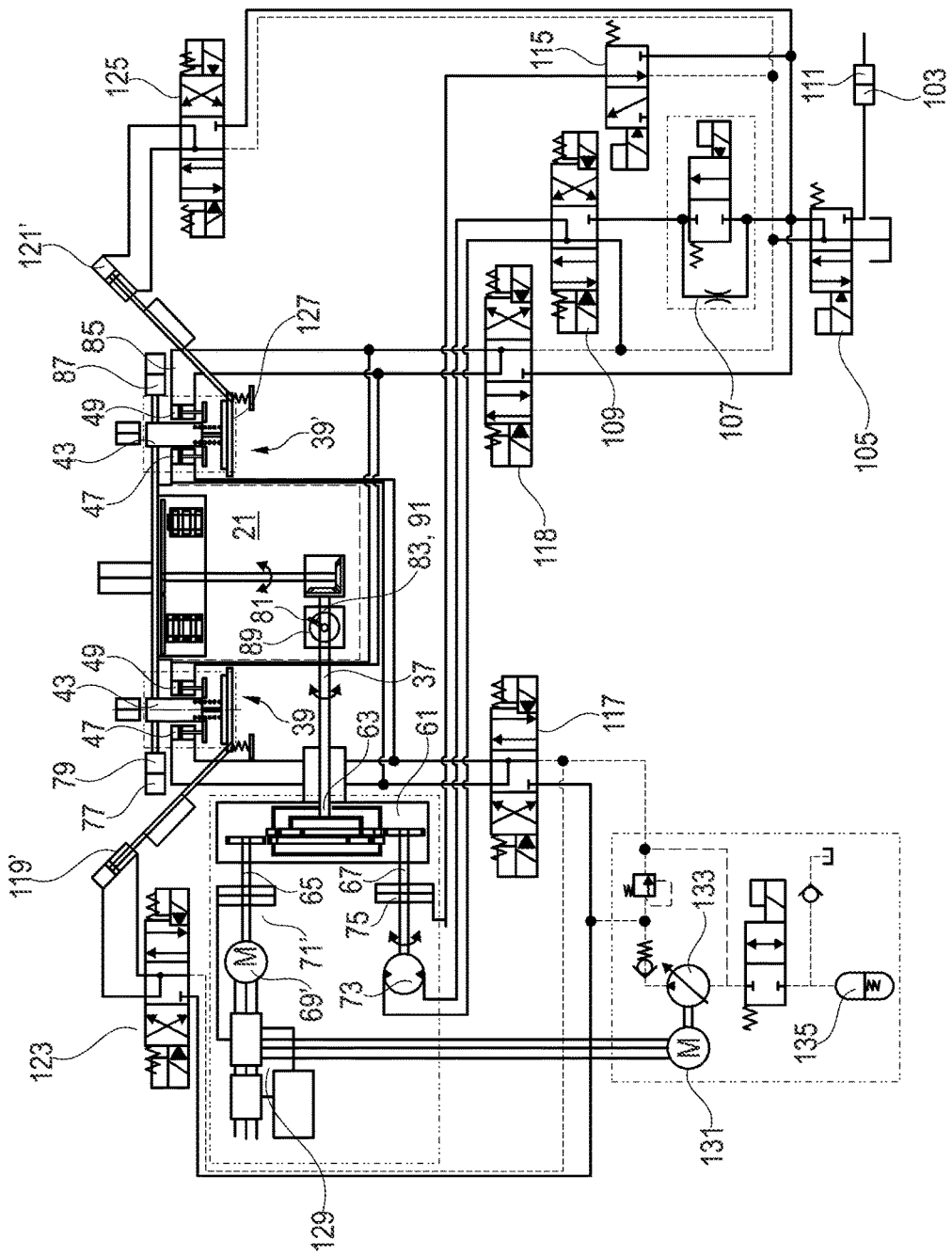
FIG. 8 is schematic diagram showing the actuating arrangement of a second embodiment.

FIG. 8 shows a second embodiment of a wing arrangement according to the present invention, and this second embodiment differs from the first embodiment only in the configuration of the actuating arrangement. In particular, in the second embodiment the tip section 13 is also pivotable with respect to a pivot axis 19 tilted by 15° with respect to the z-axis of the aircraft to which the wing arrangement is attached, and the actuator 21 and the latching devices 39, 39' are configured as described with respect to FIGS. 4 to 6.

However, different from the first embodiment the latching devices 39, 39' are provided with a locking mechanism having a shaft member 127 which is coupled to locking elements (not shown) on each latching device 39, 39', the locking elements being movable by the shaft member 127 between a locking position in which the latching bolt 43 is prevented from leaving either the latching position or the release position, and an enabling position, in which the latching bolt 43 is free to move. The shaft member 127 can be actuated either by a first actuating element 119' or a second actuating element 121'. Thus, by means of the actuating elements 119', 121' the locking elements on the latching devices 39, 39' can be moved between their respective locking and enabling positions, and the actuating elements 119', 121' are hydraulically actuated as well.

Further, in the second embodiment a first electric motor 69' is coupled to the first input shaft 65 so as to provide rotary power for the differential gearbox 61 rather than a first hydraulic motor as in case of the first embodiment. The first electric motor 69' is coupled to the first input shaft 65 via an electrically actuated first brake 71', and it is connected to a motor control unit 129 which supplies the first electric motor 69' with power and controls its operation.

In addition, the actuating arrangement of the second embodiment comprises a second electric motor 131 which is also connected to the motor control unit 129 so as to be supplied with power and to be controlled by this unit 129. The second electric motor 131 is drivingly coupled with a hydraulic pump 133 the suction side of which is connected to a hydraulic reservoir 135. The delivery side of the hydraulic pump 133 connects to valve 117 which actuates the first actuation elements 47 of the latching devices 39, 39'. Further, the delivery side is also connected to valve 123 actuating the first actuating element 119' acting on the common shaft member 127.

The second embodiment can be operated as follows. Firstly, the active/passive mode can be employed, so that in normal operation the pivotal movement of the tip section 13 is effected by the second hydraulic motor 73 supplied by the hydraulic supply 111 of the aircraft to which the wing arrangement of the second embodiment is coupled. In this regard, the valves 118, 125 for actuating the latching devices 39, 39' and the locking mechanism are operated in the manner as described in connection with the first embodiment, and the same applies to actuation of the speed control assembly 107, the actuation valve 109 and valve 115 to operate the second hydraulic motor 73 and the second brake 75.

In case the hydraulic supply 111 or one of the elements connected to it fails, the separation valve 105 can be closed and the first and the second electric motors 129, 131 can be operated so as to rotationally drive the first input shaft 65 of the differential gearbox 61 and, hence, the actuator input shaft 37 as well as the hydraulic pump 133 so as to supply pressurized hydraulic fluid to valves 117, 123. Thus, the latching devices 39, 39' and the locking mechanism can still hydraulically be operated, so that the entire system is redundant.

Furthermore, it is also conceivable that the second embodiment is operated in the active/active mode, i.e. that both the first and second electric motors 129, 131 and the second hydraulic motor 73 are concurrently operated. This would also result in the opportunity to employ motors 73, 129, 141 with smaller dimensions.

FIGS. 9 to 13 show a third embodiment of a wing arrangement of the present invention.

Figure 9:
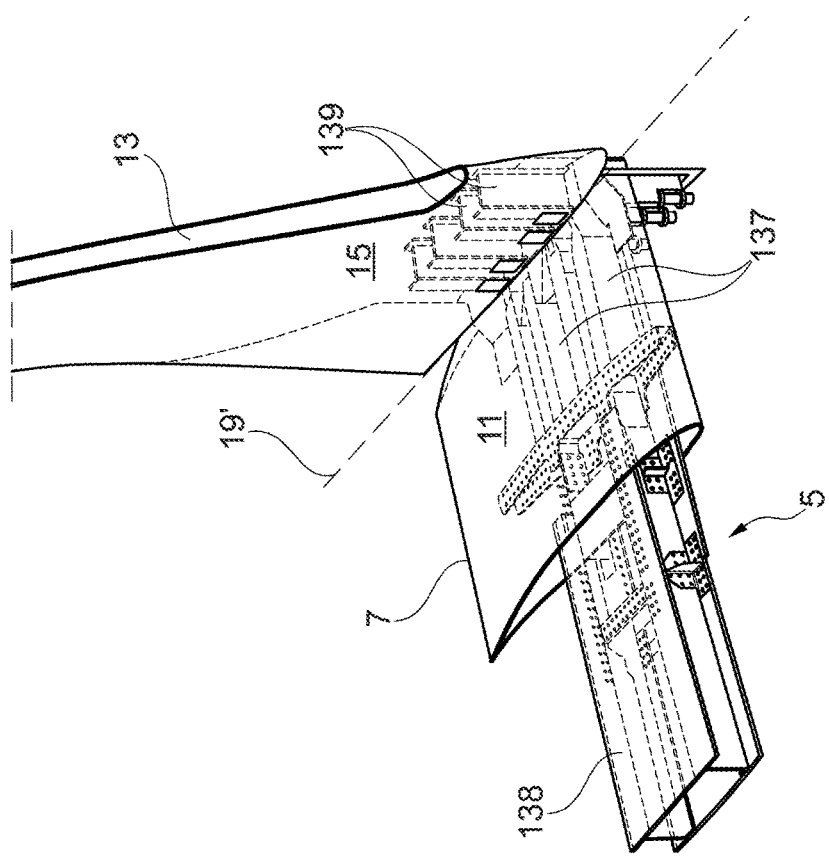
FIG. 9 is a partial perspective sectional view of the distal end of the wing of the third embodiment of a wing arrangement according to the present invention.

As can be seen from FIG. 9, the third embodiment differs from the first and second embodiments in that the tip section 13 is pivotably supported on the base section 7 of the wing 5 in such a manner that the tip section 13 may pivot between the stowed and deployed positions about a pivot axis 19' which extends in chord direction or essentially parallel the x-axis of the aircraft to which the wing arrangement is coupled. As it is shown in detail in FIG. 11, first support elements 137 provided in the second end portion 11 of the base section 7 and extending from the wing box 138 are pivotably coupled with second support elements 139 provided in the third end portion 15 of the tip section 13.

Figure 10:
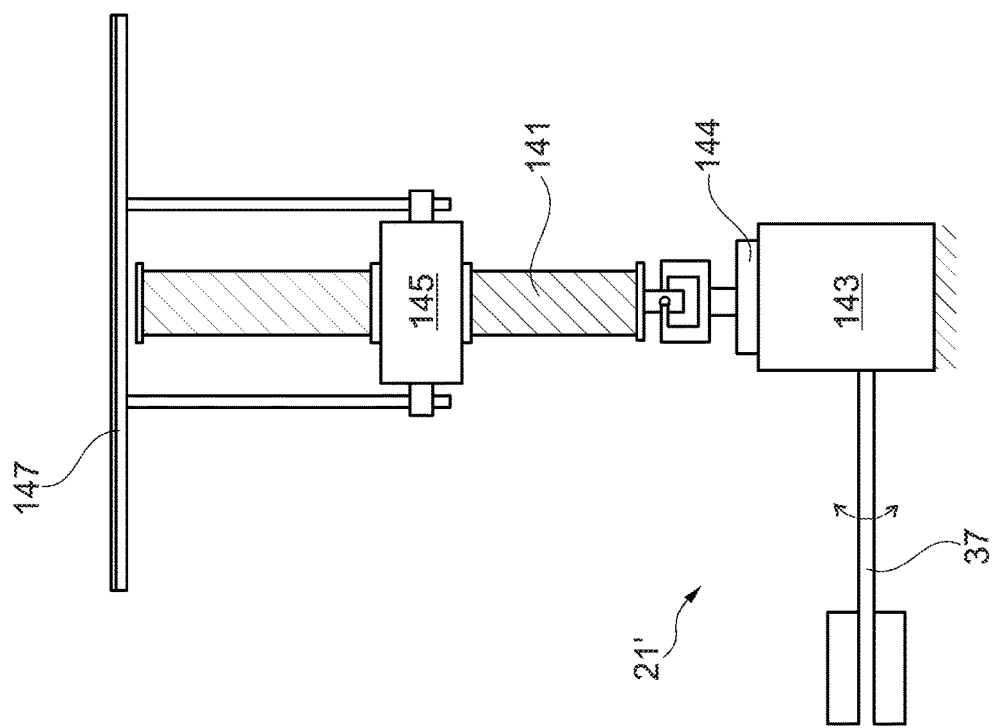
FIG. 10 is a schematic view of the actuator of the third embodiment.

In the third embodiment the pivoting movement of the tip section 13 is effected by an actuator 21' shown in detail in FIG. 10. The actuator 21' also comprises an actuator input shaft 37 which is coupled to a threaded spindle 141 via a bevel gear arrangement 143 and a spindle locking device 144, so that rotation of the input shaft 37 effects rotation of the threaded spindle 141. The threaded spindle 141 is rotatably supported and axially fixed on the second end portion 11 of the base section 7. Further, a nut member 145 threadingly engages with the threaded spindle 141 and is mounted on the third end portion 15 of the tip section 13 in such a manner that it cannot rotate with respect to the longitudinal axis of the threaded spindle 141. In particular, the nut member 145 is connected to a bar element 147 extending between two adjacent second support elements 139, the bar element 147 being spaced from the pivot axis 19'. Thus, when the threaded spindle 141 rotates the nut member 145 is moved along the threaded spindle 141 and effects the pivotal movement of the tip section 13 between the deployed position and the stowed position about the pivot axis 19'.

The spindle locking device 144 connects the actuator input shaft 37 and the threaded spindle 41 and it is configured such that the threaded spindle 141 is brought into engagement, either positively or frictionally, with the second end portion 11, so as to prevent rotation of the threaded spindle 141, when the threaded spindle 141 transmits torque to the actuator input shaft 37, and that when torque is transmitted from the actuator input shaft 37 to the threaded spindle 141, the threaded spindle is rotatable with respect to the second end portion 11. Hence, the spindle locking device 144 prevents rotation of threaded spindle 141, and a linear movement of the nut member 145, when the tip section 13 applies a force on the nut member 145 which would result in torque, the threaded spindle 141 would transmit to the actuator input shaft 3. In particular, when the tip section 9 is pivoted upwards into the stowed position, the spindle locking device 144 prevents the tip section 9 from back towards the deployed position. However, this movement is actively driven via torque applied to the actuator input shaft 37, this movement is enabled.

Figure 12:
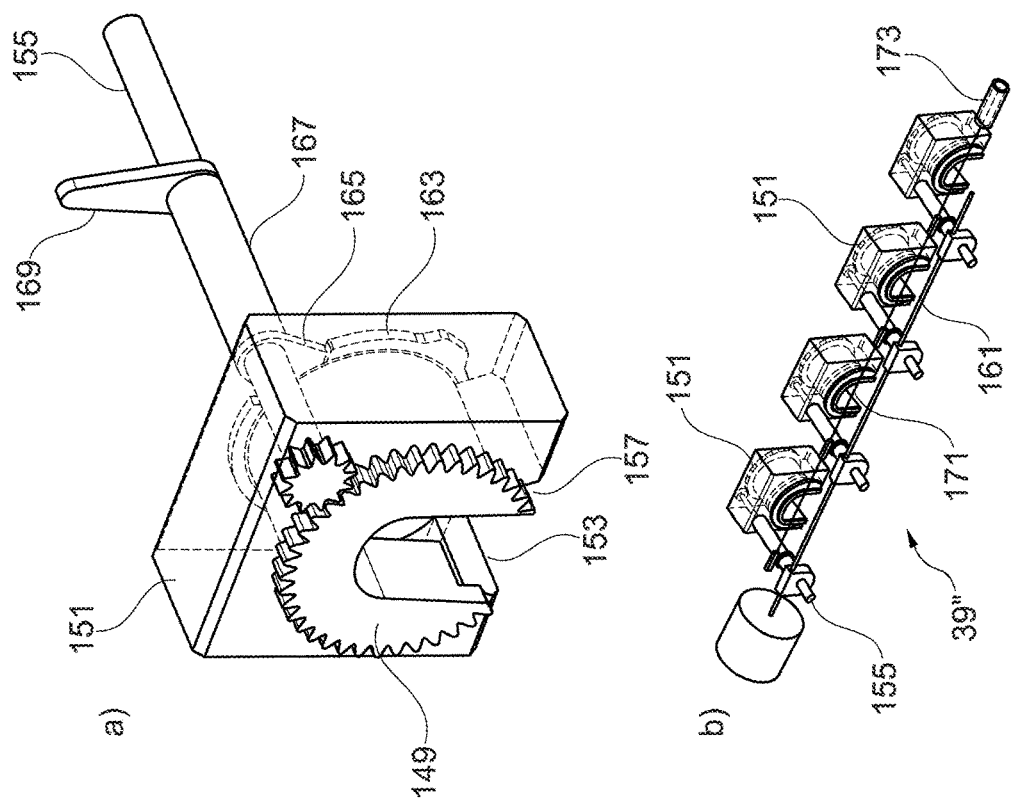
Figure 11:
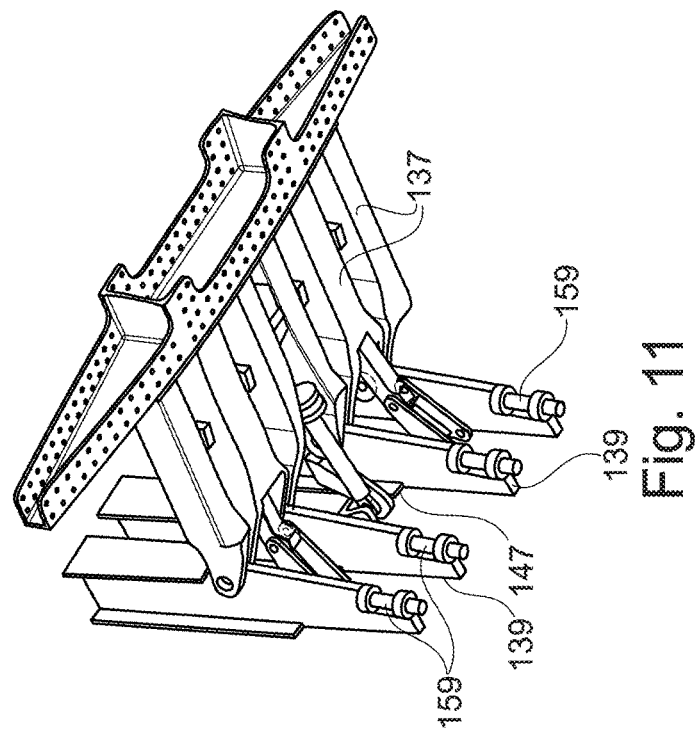
FIG. 11 is a further partial perspective sectional view from the bottom of the distal end of the wing of FIG. 9, FIG. 12 are perspective views of the latching device of the third embodiment.

Furthermore, the third embodiment also comprises a latching device 39" which comprises a plurality of toothed latching sleeves 149 rotatably supported in supports 151 mounted on the second end portion 11 of the base section 7 (see FIG. 12). The toothed latching sleeves 149 comprise a slot 153 in its circumferential wall, and by rotating the latching sleeves 149 via a drive shaft 155 the slot 153 can be aligned with a further slot 157 in the supports 151 so that engagement bolts 159 formed on the distal end of the second support elements 139 of the tip section 13 can be received in the toothed latching sleeves 149 since the slots 157 in the supports 151 point to the bottom side of the second end portion 11 of the base section 7. The drive shafts 155 are coupled to a connecting shaft 161 via bevel gears, and the connecting shaft 161 is driven by first and second motors only one of which is shown in FIG. 12.

When the tip section 13 pivots into the deployed position and the slots 153, 157 in the latching sleeves 149 and the supports 151 are aligned with each other by correspondingly driving the connecting shaft 161, so that the latching device 39" is in the release position, the engagement bolts 159 are received in the latching sleeves 149. Subsequently, the latching sleeves 149 are rotated by rotating the connecting shaft 161 so that the slots 153, 157 are no longer aligned and the latching device 39" is in the latching position. So, the engagement bolts 159 are caught in the latching sleeves 149. For releasing the engagement bolts 159, the latching sleeves 149 are rotated back into the release position in which the slots 153, 157 are aligned so that the engagement bolts 159 can move out of the latching sleeves 149, when the tip section 13 is pivoted towards the stowed position.

At one end of each latching sleeve 149 a cam disc 163 is provided which engages with a first arm 165 of a lever member 167 which is pivotably supported on the drive shaft 155. The lever member 167 comprises a second arm 169 fixedly connected to the first arm 165. When the latching sleeve 149 is in the release position the first arm 165 may engage with a recess in the cam disc 163. This engagement is effected by the second arm 169 the distal end of which is coupled to a gear, e.g. a worm gear, on a rod 171, which is rotationally driven by a rotary drive 173. When the first arm 165 engages with the recess in the cam disc 163, the latching sleeve 149 is locked in the release position. Similarly, when the latching sleeve 149 reaches the latching position, so that the slots 153, 157 are not aligned with each other, the first arm 165 can also be brought into engagement with a corresponding recess in the cam disc 163 via the rod 171 and the rotary drive 173 so as to lock the latching sleeve 149 in the latching position. Hence, the first arm 165 acts as a locking element which can be brought into a locking position, i.e. by moving it into a recess in the cam disc 163, when the latching sleeve 149 is either in the latching or in the release positions which prevents a movement of the latching sleeve 149 away from the respective position. When the first arm 165 is in its enabling position, i.e. pivoted out of engagement with the recesses, the latching sleeve 149 can moved between the latching and the release positions.

Figure 13:
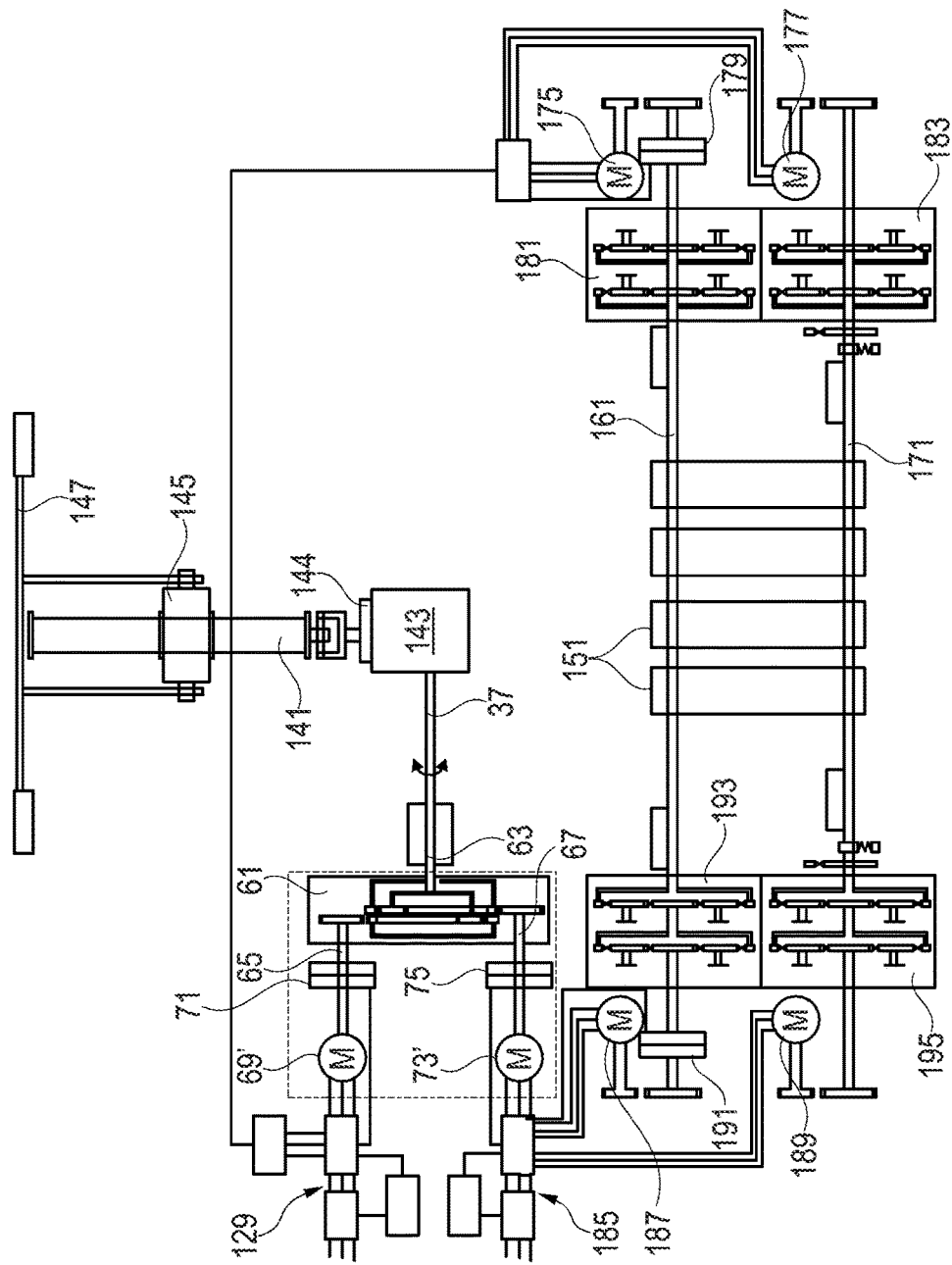
FIG. 13 is a schematic diagram of the actuating arrangement of the third embodiment.

FIG. 13 schematically shows the actuating arrangement of the third embodiment. Similar to the first and second embodiments, a differential gearbox 61 is provided, and the output shaft 65 of the differential gearbox 61 is coupled with the actuator input shaft 37 which drives the threaded spindle 141. The first input shaft 65 is coupled to the output shaft of a first electric motor 69' via a first electric brake 71, whereas the output shaft of a second electric motor 73' is coupled to the second input shaft 67 of the differential gearbox 61 via a second electrically actuated brake 75.

The first electric motor 69' is connected to a first motor control unit 129 which supplies the first motor 69' with power and controls it. In addition, the first motor control unit 129 is connected to a third electric motor 175 and a fourth electric motor 177. The third electric motor 175 is coupled to the connecting shaft 161 of the latching device 39" via a third electrically actuated brake 179 and a planetary gearbox 181. Hence, the third electric motor 175 is employed to move the latching sleeves 149 between their latching and release positions. The fourth electric motor 177 is part of the rotary drive for rotating the rod 171 and is coupled to it via a planetary gearbox 183.

A second motor control unit 185 is connected to the second electric motor 73' so as to control operation thereof. Further, the second motor control unit 185 is also connected to a fifth electric motor 187 and a sixth electric motor 189, the fifth motor 187 being connected to the connecting shaft 161 via a brake 191 and a planetary gearbox 193 so that the fifth motor 187 is a drive for changing the position of the latching sleeves 149 of the latching device 39". The output of the sixth electric motor 189 is coupled with the rod 171 via a planetary gearbox 195. Hence, the sixth electric motor 189 is adapted to actuate the lever members 167 for locking the latching sleeves 149 either in the latching or the release positions.

The first and the second motor control units 129, 185 are coupled to electric power supplies which are independent from each other, so as to ensure that when the power supply of one control unit 129, 185 fails, functioning the other control unit is not affected.

The third embodiment of a wing arrangement according to the present invention can be operated as follows. In a first alternative the active/passive mode is employed. When it is intended to move the tip section 13 from the deployed position to the stowed position, firstly the fourth electric motor 177 is actuated to disengage the first arms 165 from the cam discs 163 of latching device 39" so that the lever members 167 or locking elements are moved from the locking position to the enabling position. Subsequently, the third motor 175 is operator so as to rotate the latching sleeves 149 from the latching position in which the engagement bolts 159 are caught in the latching sleeves 149, to the release position so that the slots 153, 157 are aligned.

Then, the first brake 71 is released and the first electric motor 69' is operated so that the first input shaft 65 of the differential gearbox 61 is driven as well as the threaded spindle 141. This results in an axial movement of the nut member 145 along the spindle 141 and, hence, the tip section 13 pivots about the pivot axis 19' to the stowed position. When the stowed position is reached, the first electric motor 69' is stopped. The afore-mentioned spindle locking device 144 prevents the tip section 9 from pivoting back so that it is latched in the stowed position.

Similarly, when it is intended, that the tip section 13 returns to the deployed position, the first motor 69' is operated again, so that the nut member 145 moves back to its initial position in which the tip section 13 has reached the deployed position. Then the third and the fourth motor 175, 177 are subsequently operated, to first latch the tip section 13 in the deployed position by engagement of the engagements bolts 159 with the latching sleeves 149 and secondly to lock the latching sleeves 149 in the respective position.

If the power supply for the first motor control unit 129 or one of the motor 69', 175, 177 fails, the second motor control unit 185, the second electric motor 73', the fifth and the sixth motor 187, 189 can be employed in the same way as described before.

In a second alternative, the actuating arrangement of this embodiment can be operated in an active/active mode, in which the motors 69', 73' are simultaneously operated to rotationally drive the threaded spindle 141. As already discussed this allows for the use of smaller motors 69', 73', as during normal use the output of the motors 69', 73' is combined in the differential gearbox 61 to provide for the required operational speed.

When being operated in this mode, the motors 63', 73' have only to be designed such that when one motor fails the other is still capable of rotating the threaded spindle 141 against the respective loads, and this may occur with a reduced speed.

Figure 14:
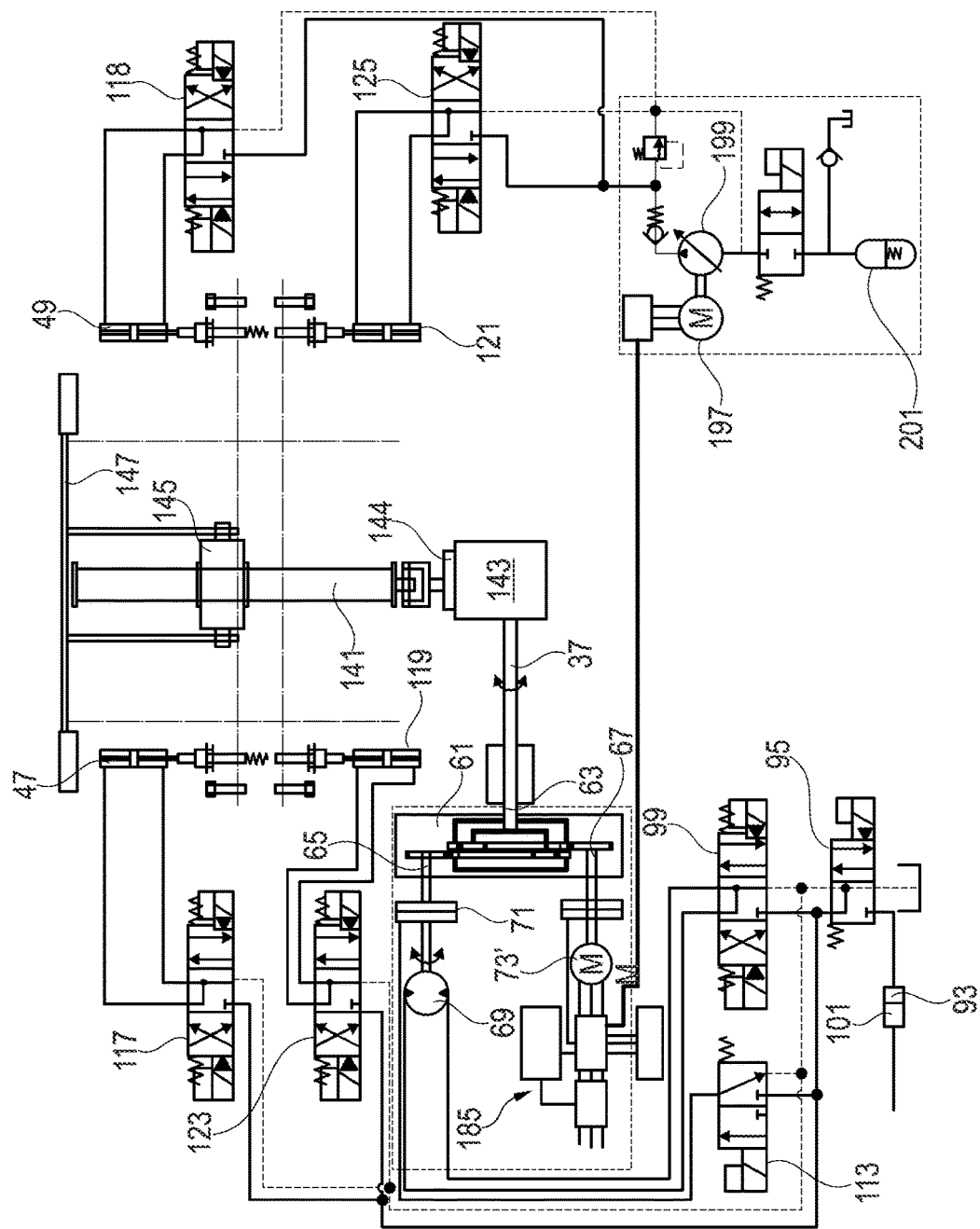
FIG. 14 is a schematic diagram of the actuating arrangement of a fourth embodiment of a wing arrangement of the present invention and FIG. 15 is a schematic diagram of the actuating arrangement of a fifth embodiment of a wing arrangement of the present invention.

In FIG. 14 shows the actuating arrangement of a fourth embodiment of a wing arrangement of the present invention. The wing of the fourth embodiment is configured in the same way as the third embodiment, so that the tip section 13 pivots about a pivot axis 19' extending in chord direction and it also employs an actuator 21 using a threaded spindle 141 with a nut member 145 coupled to the tip section 13.

The differences to the third embodiment can be seen in FIG. 14 showing the actuating arrangement of the fourth embodiment. The first difference is, that a first hydraulic motor 69 is employed to rotationally drive the first input shaft 65 of the differential gearbox 61 whereas the second input shaft 67 is still driven by an electric motor 73' connected to a motor control unit 185.

The first hydraulic motor 69 is connected to a connector 93 which in turn is connected to a first hydraulic supply 101 of the aircraft to which the wing arrangement of the fourth embodiment is mounted. Between the first hydraulic motor 69 and the connector 93 is a separation valve 95 with which the actuating arrangement can be disconnected from the connector 93 and the hydraulic supply 101. Further, an actuation valve 99 is provided with which operation of the first hydraulic motor 69 can be controlled. Further, valve 113 is used to control the brake 71 between the first hydraulic motor 69 and the first input shaft 65. Finally, the connector 93 is also connected to valves 117, 123 so that they are provided with pressurized hydraulic fluid from the first hydraulic supply 101 as well.

The motor control unit 185 is connected to a third electric motor 197 the output of which is coupled to a hydraulic pump 199. The suction side of the hydraulic pump 199 is connected with a reservoir 201 and the delivery side provides pressurized hydraulic fluid to valves 118, 125.

In the fourth embodiment a latching assembly is provided which comprises latching elements (not shown) which are moveable relative to the second end portion 11 of the base section 7 between a latching position and a release position by a first hydraulic actuation element 47 and a second hydraulic actuation element 49, the first actuation element 47 being connected to valve 117 whereas the second actuation element is supplied via valve 118. Hence, the latching elements can be moved by pressurized hydraulic fluid either supplied by the first hydraulic supply 101 or by the hydraulic pump 199.

When the latching elements are in the latching position, the tip section 13 is latched in the deployed position so that it cannot be pivoted out of this position relative to the base section 7. When the latching element is in the release position, such movement is enabled.

Finally, the actuating arrangement of the fourth embodiment comprises a hydraulically actuated locking mechanism comprising locking elements (not shown) which can be moved between a locking position and an enabling position by first and second hydraulic actuating elements 119, 121. The first actuating element 119 is supplied by the first hydraulic supply 101 via valve 123 and separation valve 95 whereas the second actuating element 121 is supplied by the hydraulic pump 199 via valve 125. When the locking elements are in the locking position, the latching elements are locked in the latching position so that the latching elements cannot be moved whereas when the locking elements are in the enabling position the latching elements can be moved between their respective positions.

The fourth embodiment can be operated in the following manner.

Firstly, it is possible that the fourth embodiment is operated in an active/passive mode. For pivoting the tip section 13 from the deployed position to the stowed position, in a first step valve 123 and separation valve 95 are actuated so as to move the locking elements from the locking position to the enabling position by the first actuating element 119 which is supplied with pressurized fluid from the first hydraulic supply 101. Then valve 117 is actuated so as to move the latching elements to the release position. Then the first brake 71 is released by valve 113 and the first hydraulic motor 69 is activated so that the threaded spindle 141 is driven and the tip section 13 is pivoted until it has reached the stowed position. In this position, it is latched by the spindle locking device 144.

When the hydraulic supply 101 or one of the devices operated by pressurized hydraulic fluid from the hydraulic supply 101 fails, the second and third electric motors 73', 197 can be used to move the threaded spindle 141 and to provide pressurized hydraulic fluid for moving the latching element by the second actuation element 49 and for moving the locking element by the second actuating element 121, both being controlled by valves 118, 125.

Finally, during normal operation the actuating arrangement of the fourth embodiment may also be operated in the active/active mode, i.e. for driving the threaded spindle 141 both the first hydraulic motor 69 and the second electric motor 73' are activated so that motors 69, 73' can be used having smaller dimensions compared to the case where during normal operation only one motor drives the threaded spindle 141.

Figure 15:
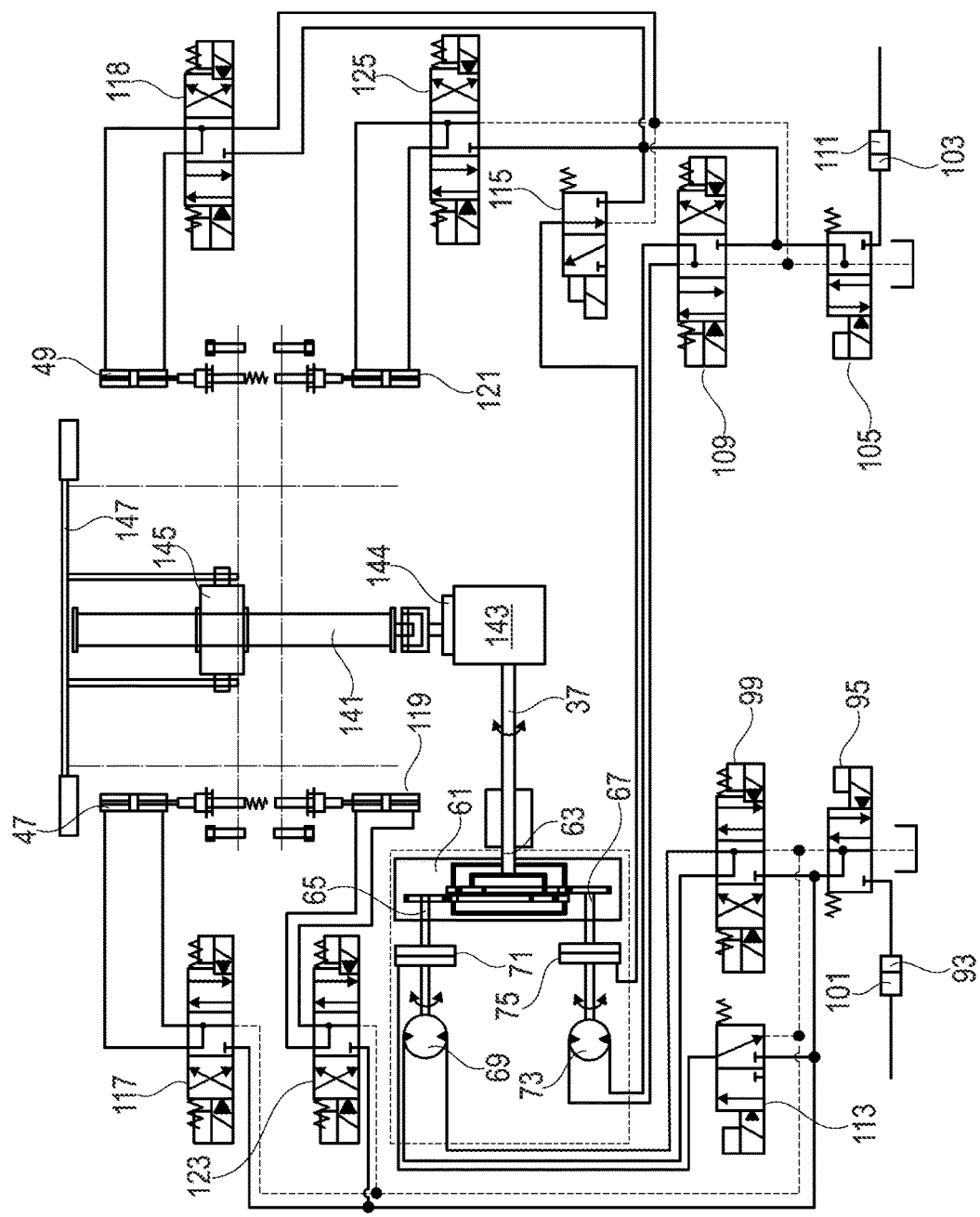

The fifth embodiment of the a wing arrangement of the present invention the actuating arrangement of which is shown in FIG. 15, differs from the fourth embodiment only in that also the second motor 73 is a hydraulic motor which is coupled to a second hydraulic supply 111 of the aircraft via a second connector 103.

The second hydraulic motor 73 is connected to the second hydraulic supply 111 via separation valve 105 and actuation valve 109, and the second actuation element 49 of the latching device as well as the second actuating element 121 are also coupled to the second hydraulic supply 111 via valves 118, 125. Hence, instead of supplying pressurized hydraulic fluid by an electrically driven hydraulic pump as it is the case in the fourth embodiment, a further hydraulic supply 111 is employed to obtain redundancy. Further, the fifth embodiment can be operated in active/passive mode and in active/active mode.

A wing arrangement for an aircraft is described herein comprising a wing (5) having a base section (5) and a tip section (13), the base section (7) having a first end portion (9) and a second end portion (11), the tip section (13) having a third end portion (15) and a fourth end portion (17), wherein the second end portion (11) and the third end portion (15) are coupled with each other so that the tip section (13) is pivotable with respect to the base section (7) about a pivot axis (19, 19'), and an actuating arrangement having an actuator (21) which is coupled to the base section (7) and the tip section (13) and which is operable to effect a pivotal movement of the tip section (13) relative to the base section (7) between a stowed position and a deployed position, wherein the actuator (21) has a rotatable actuator input shaft (37), a differential gearbox (61) having a rotatable output shaft (63), a first rotatable input shaft (65) and a second rotatable input shaft (67), wherein the first input shaft (65) of the differential gearbox (61) is coupled to the output shaft of the first motor (69) and the second input shaft (67) of the differential gearbox (61) is coupled to the output shaft of the second motor (73) and wherein the output shaft (63) of the differential gearbox (61) is coupled to the actuator input shaft (37).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing arrangement for an aircraft comprising:
   a wing having a base section and a tip section, the base section having a first end portion and a second end portion, the tip section having a third end portion and a fourth end portion,
      wherein the first end portion is adapted to be coupled to the fuselage of the aircraft,
      wherein the second end portion and the third end portion are coupled with each other so that the tip section is pivotable with respect to the base section about a pivot axis,
   and an actuating arrangement having
      an actuator which is coupled to the base section and the tip section and which is operable to effect a pivotal movement of the tip section relative to the base section between a stowed position and a deployed position,
         wherein the spanwise length of the wing is larger in the deployed position than in the stowed position,
         wherein the actuator has a rotatable actuator input shaft which is rotatably supported on the base section and
         wherein the actuator is configured such that rotationally driving the actuator input shaft effects a pivotal movement of the tip section relative to the base section about the pivot axis between the deployed and stowed positions,
      a differential gearbox having a rotatable output shaft, a first rotatable input shaft and a second rotatable input shaft,
         wherein the first input shaft, the second input shaft and the output shaft are coupled such that rotary power applied to the first or second input shaft is transmitted to the output shaft and wherein the first and second input shafts are capable of being simultaneously rotatingly driven with different rotational speeds,
      a first motor and a second motor each having a rotationally driven output shaft,
         wherein the first input shaft of the differential gearbox is coupled to the output shaft of the first motor and the second input shaft of the differential gearbox is coupled to the output shaft of the second motor and
         wherein the output shaft of the differential gearbox is coupled to the actuator input shaft.

2. The wing arrangement according to claim 1, wherein the first input shaft of the differential gearbox is coupled to a first brake assembly which is operable to selectively allow or prevent rotation of the first input shaft and
   wherein the second input shaft of the differential gearbox is coupled to a second brake assembly which is operable to selectively allow or prevent rotation of the second input shaft.

3. The wing arrangement according to claim 1, wherein the first motor is a hydraulic motor and has a first hydraulic connection and
   wherein the first hydraulic connection is connected to a first connector which is adapted to be coupled to a first hydraulic supply of the aircraft, the first hydraulic supply being capable of supplying a plurality of consumers in the aircraft.

4. The wing arrangement according to claim 3, wherein the second motor is a hydraulic motor and has a second hydraulic connection and
   wherein the second hydraulic connection is provided with a second connector which is adapted to be coupled to a second hydraulic supply of the aircraft, the second hydraulic supply being capable of supplying a plurality of consumers in the aircraft.

5. The wing arrangement according to claim 3, wherein the second motor is an electric motor.

6. The wing arrangement according to claim 1, wherein the first and second motors are electric motors.

7. The wing arrangement according to claim 1, wherein the actuating arrangement includes a latching assembly which comprises a latching device having a support fixed to one of the base section and the tip section, a latching element moveable relative to the support between a latching position and a release position, a first actuation element and a second actuation element,
   wherein the latching arrangement further includes an engagement element mounted on the other of the base section and the tip section,
   wherein the latching device and the engagement element are configured such that
      when the tip section is in the deployed position and the latching element is in the latching position, the latching element engages with the engagement element so as to prevent the relative pivotal movement between the base section and the tip section, and
      when the latching element is in the release position, the latching element is disengaged from the engagement element, so that the pivotal movement between the base section and the tip section is enabled,
   wherein the actuation elements are coupled to the latching element and configured such that when at least one of the actuation elements is operated, the latching element is forced into the release position.

8. The wing arrangement according to claim 7, wherein the first and the second actuation elements are hydraulically powered,
   wherein the first actuation element is connected to a first connector which is adapted to be coupled to a first hydraulic supply of the aircraft, the first hydraulic supply being capable of supplying a plurality of consumers in the aircraft and wherein the second actuation element is connected to a second connector which is adapted to be coupled to a second hydraulic supply of the aircraft, the second hydraulic supply being capable of supplying a plurality of consumers in the aircraft.

9. The wing arrangement according to claim 7, wherein the first and the second actuation elements are hydraulically powered,
   wherein the first actuation element is connected to a first connector which is adapted to be coupled to a hydraulic supply of the aircraft, the hydraulic supply being capable of supplying a plurality of consumers in the aircraft and
   wherein the actuating arrangement comprises a hydraulic pump which includes a rotatable input shaft and a hydraulic output, and an electric drive motor the output of which is coupled with the input shaft of the hydraulic pump, and
   wherein the hydraulic output of the hydraulic pump is hydraulically connected with the second actuation element.

10. The wing arrangement according to claim 7 wherein the first and the second actuation elements are electrically powered.

11. The wing arrangement according to claim 1, wherein the actuator comprises a threaded spindle rotatably supported and axially fixed on the base section and a nut member which threadingly engages with the threaded spindle and which is mounted on the tip section in such a manner that it cannot rotate with respect to the longitudinal axis of the threaded spindle, and
   wherein the actuator input shaft is coupled to the threaded spindle so that rotation of the actuator input shaft effects rotation of the threaded spindle or the actuator input shaft is part of the threaded spindle.

12. The wing arrangement according to claim 11, wherein a spindle locking device is interconnected between the actuator input shaft and the threaded spindle and which is configured such that the threaded spindle is brought into engagement with the second end portion so as to prevent rotation of the threaded spindle, when the threaded spindle transmits torque to the actuator input shaft, and that when torque is transmitted from the actuator input shaft to the threaded spindle, the threaded spindle is rotatable with respect to the second end portion.

13. The wing arrangement according to claim 1, wherein the actuator comprises a base member and an output member,
   wherein the output member is pivotably mounted on the base member so that the output member may pivot with respect to the base member about the pivot axis,
   wherein the base member is fixed to the second end portion and the output member is fixed to the third end portion,
   wherein a gear assembly is connected to the actuator input shaft and the output member, the gear assembly being configured such that rotationally driving the actuator input shaft with a first rotational speed results in a pivot movement of the output member relative to the input member about the pivot axis with a second rotational speed smaller than the first rotational speed.

14. The wing arrangement according to claim 1, comprising a first end stop fixedly connected to the base section and a first abutment member fixed on the tip section, the first end stop and the first abutment member being configured such that in the deployed position the first end stop and the first abutment member abut on each other and prevent a further pivotal movement of the tip section relative to the base section in a direction opposite to the direction towards the stowed position,
   wherein a second end stop is fixed to the base section and a second abutment member is fixed to the actuator input shaft and
   wherein the second end stop and the second abutment member are positioned such that an abutment of the second end stop and the second abutment member prevents a further rotation of the actuator input shaft in a rotational direction that effects a pivotal movement of the tip section about the pivot axis towards the deployed position,
   wherein the positions of the first and second end stops and the first and second abutment members are chosen such that when the first end stop abuts on the first abutment member, the second end stop is spaced from the second abutment member so that a predetermined amount of rotational movement of the actuator input shaft in that rotational direction which effects a pivotal movement of the tip section towards the deployed position is required to bring the second end stop into abutment with the second abutment member.

15. An aircraft comprising a fuselage and at least one wing arrangement according to claim 1.

* * * * *